United States Patent
Neuerburg (10) Patent No.: US 7,370,459 B2
(45) Date of Patent: May 13, 2008

(54) AGRICULTURAL MACHINE, PARTICULARLY OF THE ROTARY MOWER TYPE, COMPRISING AN IMPROVED CHOPPING DEVICE

(75) Inventor: Horst Neuerburg, Saverne (FR)

(73) Assignee: Kuhn S.A., Saverne (FR)

( * ) Notice: Subject to any disclaimer, the term of this patent is extended or adjusted under 35 U.S.C. 154(b) by 0 days.

(21) Appl. No.: 10/488,249

(22) PCT Filed: Oct. 1, 2002

(86) PCT No.: PCT/FR02/03334

§ 371 (c)(1),
(2), (4) Date: Mar. 11, 2004

(87) PCT Pub. No.: WO03/028436

PCT Pub. Date: Apr. 10, 2003

(65) Prior Publication Data

US 2004/0237489 A1 Dec. 2, 2004

(30) Foreign Application Priority Data

Oct. 3, 2001 (FR) .................................. 01 12699

(51) Int. Cl.
*A01D 34/00* (2006.01)
(52) U.S. Cl. .................. 56/13.6; 56/6; 56/235
(58) Field of Classification Search .............. 56/6, 56/13.6, 255, 254, 234, 235
See application file for complete search history.

(56) References Cited

U.S. PATENT DOCUMENTS 2,187,833 A * 1/1940 Lock et al. ................. 172/834
3,236,034 A * 2/1966 Blettner ........................... 56/6
3,570,228 A * 3/1971 Phillips ......................... 56/234
3,857,225 A * 12/1974 Knudson ..................... 56/13.6
4,232,505 A * 11/1980 Walto ........................... 56/12.7
4,304,088 A   12/1981 Werner
4,686,818 A    8/1987 Zweegers
4,693,062 A    9/1987 Van Der Lely et al.
4,922,693 A * 5/1990 Neuerburg ................... 56/13.6
6,138,444 A * 10/2000 Torras, Sr. ....................... 56/6

FOREIGN PATENT DOCUMENTS

| DE | 2524348  | 12/1976 |
|----|----------|---------|
| DE | 19927966 | 2/2000  |
| EP | 1002458  | 5/2000  |
| FR | 2548862  | 1/1985  |

* cited by examiner

*Primary Examiner*—Thomas B. Will
*Assistant Examiner*—Alicia Torres
(74) *Attorney, Agent, or Firm*—Oblon, Spivak, McClelland, Maier & Neustadt, P.C.

(57) ABSTRACT

An agricultural machine fitted with a chopping device. The chopping device includes a guard, at least three chopping members disposed above the guard and that are linked thereto to pivot around a shaft directed upwards, and transmission elements that rotate the chopping members around the respective shafts. Among the chopping members at least two adjacent chopping members rotate in opposite directions converging towards the front. The distance separating the rotary shafts of two adjacent chopping members rotating in opposite directions converging towards the front is greater than at least a distance separating the rotary shafts of two adjacent chopping members having directions of rotation that do not converge towards the front. The arrangement of the chopping members in this manner can be used advantageously to improve the removal of the chopped product towards the rear of the chopping device.

6 Claims, 7 Drawing Sheets

AGRICULTURAL MACHINE, PARTICULARLY OF THE ROTARY MOWER TYPE, COMPRISING AN IMPROVED CHOPPING DEVICE

The present invention relates to the overall technical field of agricultural machinery and in particular to the field of machines of the mower or mower-conditioner type.

More specifically, the present invention relates to an agricultural machine equipped with a cutting device, said cutting device comprising:
- a casing,
  - at least three cutting members arranged above said casing and connected to said casing such that they can pivot about an upwardly-directed respective axis,
  - transmission elements driving the rotation of said cutting members about said respective axes, and
  - of said cutting members, at least two adjacent cutting members having directions of rotation that are opposed and converge toward the front.

An agricultural machine such as this is known from the prior art, particularly from document EP 1 002 458 A1. Indeed, that document describes a disk mower comprising a cutting device and a chassis. Said chassis allows said cutting device to be connected to an agricultural tractor. For its part, said cutting device comprises a casing and cutting members. Said cutting members are arranged at regular intervals above said casing. In addition, said cutting members are connected such that they can pivot to said casing by means of a respective articulation the axis of which is directed upward. During work, said cutting members are rotationally driven by transmission elements so as to cut a standing product, for example grass.

For this, each cutting member comprises, in that earlier document, a support in the form of a disk and two cutting elements. Said cutting elements are connected to the periphery of said support, on each side of the axis of rotation of the corresponding cutting member. During work, said cutting elements therefore describe a circle about said axis of rotation and cut the standing product by impact. For its part, said support, in addition to connecting said cutting elements to said axis of rotation, also has the function of conveying the product thus cut.

In a way known to those skilled in the art, said cutting members are close enough together that the circles described by the cutting elements of two adjacent cutting members overlap. As a result, the paths of the cutting elements of two adjacent cutting members cross at two points. In order for the standing product to be cut across the entire width of said cutting device, one of said points of intersection has necessarily to be situated forward of said casing.

In a way also known to those skilled in the art, the cutting members of a mower do not all adopt the same direction of rotation. Thus, this known mower comprises, on the one hand, adjacent cutting members that have identical directions of rotation. Such cutting members, generally situated at the ends of said casing, advantageously allow the cut product to be brought close to a vertical mid-plane of said cutting device. This known mower also comprises adjacent cutting members that have directions of rotation that are opposed and converge toward the front. Such cutting members on the other hand allow said cut product to be conveyed to the rear of said cutting device. Finally, this known mower may also comprise adjacent cutting members that have directions of rotation that are opposed and diverge toward the front.

With the rotary mowers as described in that earlier document, it is important to obtain effective discharge of the cut product toward the rear of said cutting device. This is because poor discharge of the cut product could clog the working area of said cutting elements and thus degrade the cutting quality of said mower. In practice, it is also found that poorly discharged cut product may cause said cutting device to jam, that is to say the rotation of said cutting members to become jammed. To improve the conveyance of the cut product at said cutting members, agricultural machinery constructors have hitherto concentrated on the shape and/or size of said supports and of said cutting elements.

The present invention advantageously proposes a novel approach to improving the conveyance of the cut product toward the rear of said cutting device and for thus obtaining remarkable cutting quality.

Effectively, the agricultural machine of the present invention is characterized in that the distance separating the axes of rotation of two adjacent cutting members having directions of rotation that are opposed and converge toward the front, is greater than at least a distance separating the axes of rotation of two adjacent cutting members that have directions of rotation that do not converge toward the front.

As a result, the increase in the distance separating the axes of rotation of two adjacent cutting members that have directions of rotation that are opposed and converge toward the front advantageously makes it possible to increase the longitudinal component of the tangent to the point of intersection of the circles described by said corresponding cutting elements. The increase in said longitudinal component gives rise to better conveying of the cut product toward the rear of said cutting device. The cutting quality of said mower is thus improved.

In order to maintain the same cutting-device working width, the increase in said distance separating the axes of rotation of two adjacent cutting members that have directions of rotation that are opposed and converge toward the front, is accompanied by a reduction in at least one of said distances separating the axes of rotation of two adjacent cutting members that have directions of rotation that do not converge toward the front. This reduction in the distance between two adjacent cutting members advantageously makes it possible to increase the area of overlap of the circles described by the corresponding cutting elements. A greater area of overlap improves the cutting quality of said mower still further.

Other characteristics of the invention, to be considered separately or in all possible combinations, will become further apparent from the following description of a non-limiting exemplary embodiment of the invention, depicted in the appended drawings, in which.

Figure 1:
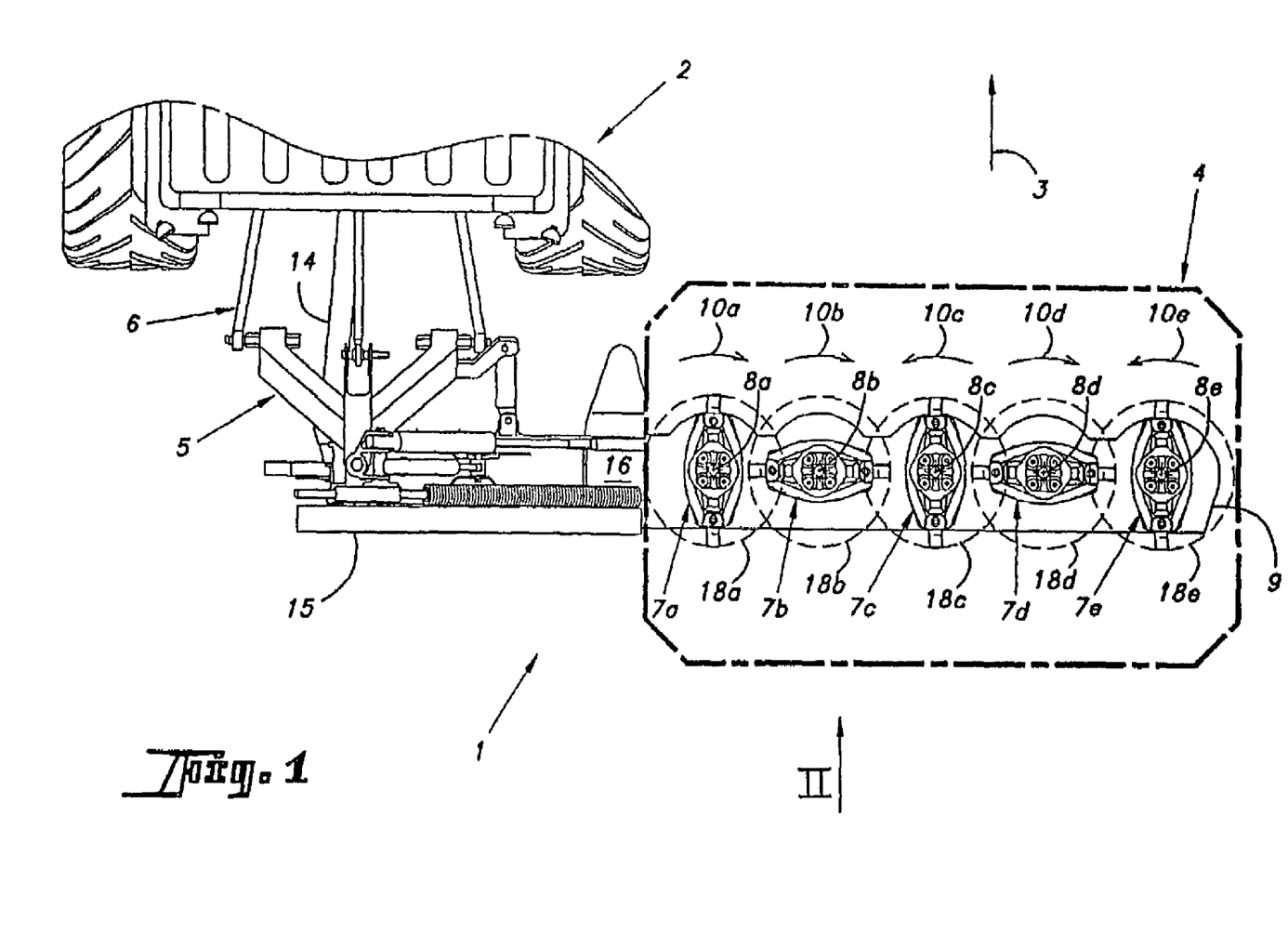
FIG. 1 depicts, in a view from above, an agricultural machine according to the invention.

FIG. 1 depicts, in a view from above, an agricultural mower (1) according to the present invention. Said mower (1) is coupled to a motor vehicle (2) which pulls it along in a direction and sense of forward travel, indicated by the arrow (3). In the remainder of the description, the following ideas of "front" and "rear", "in front of" and "behind" are defined with respect to the direction of forward travel (3) and the ideas of "right" and "left" are defined when viewing said mower (1) from the rear in the direction of forward travel (3).

In a way known to those skilled in the art, said mower (1) comprises a cutting device (4) intended to cut a standing product such as grass for example. Said mower (1) also comprises a chassis (5) allowing said cutting device (4) to be connected to said motor vehicle (2).

Figure 2:
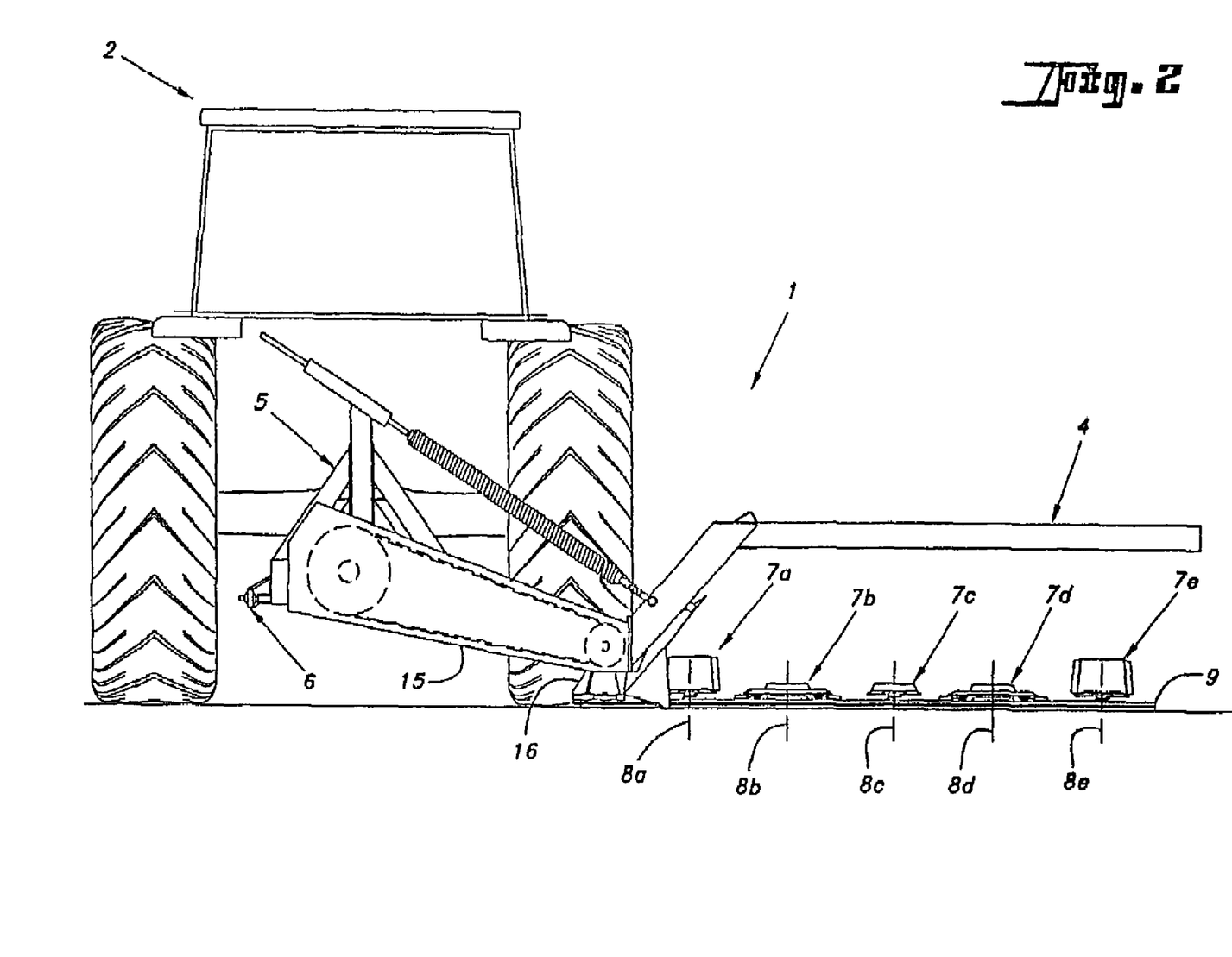
FIG. 2 depicts, viewed from the rear in the direction of arrow II defined in FIG. 1, the agricultural machine of FIG. 1.

In the exemplary embodiment depicted in FIGS. 1 and 2, said agricultural mower (1) is of the rear mounted type. During work, said chassis (5) is therefore coupled to a three-point lifting hitch (6) of said motor vehicle (2) and said cutting device (4) is situated somewhat behind and to the side of said motor vehicle (2). Such a chassis (5) of a mower (1) is known per se and will not be described further. However, for fuller details, the person skilled in the art may refer to document EP 0 723 739 where such a chassis (5) is perfectly well described.

The cutting device (4) according to the present invention comprises a casing (9) and at least three cutting members (7a, 7b, 7c, 7d, 7e). During work, depicted in FIGS. 1 and 2, said casing (9) rests at least partially on the ground, transversely to said direction of travel (3). Said cutting members (7a, 7b, 7c, 7d, 7e) are, for their part, driven in a direction of rotation (10a, 10b, 10c, 10d, 10e) about a respective axis (8a, 8b, 8c, 8d, 8e) directed upward. For this, each cutting member (7a, 7b, 7c, 7d, 7e) is connected such that it can pivot to said casing (9) by means of a respective articulation. In addition, each cutting member (7a, 7b, 7c, 7d, 7e) is engaged with a transmission element. In the work position, said cutting members (7a, 7b, 7c, 7d, 7e) are more precisely arranged above said casing (9). As a preference, said cutting members (7a, 7b, 7c, 7d, 7e) are aligned in a straight line and arranged in one and the same plane of extension.

In the exemplary embodiment depicted in FIGS. 1 and 2, said casing (9) is a one-piece casing and said transmission elements are made up in particular of a train of gears arranged inside said casing (9). Each cutting member (7a, 7b, 7c, 7d, 7e) is thus engaged with at least one of said gears present inside said casing (9). In a way known to those skilled in the art, said train of gears is driven by a power take-off of said motor vehicle (2) by means in particular of a universal-jointed telescopic transmission shaft (14), a system of belts and pulleys (15) and a transmission box (16).

Figure 3:
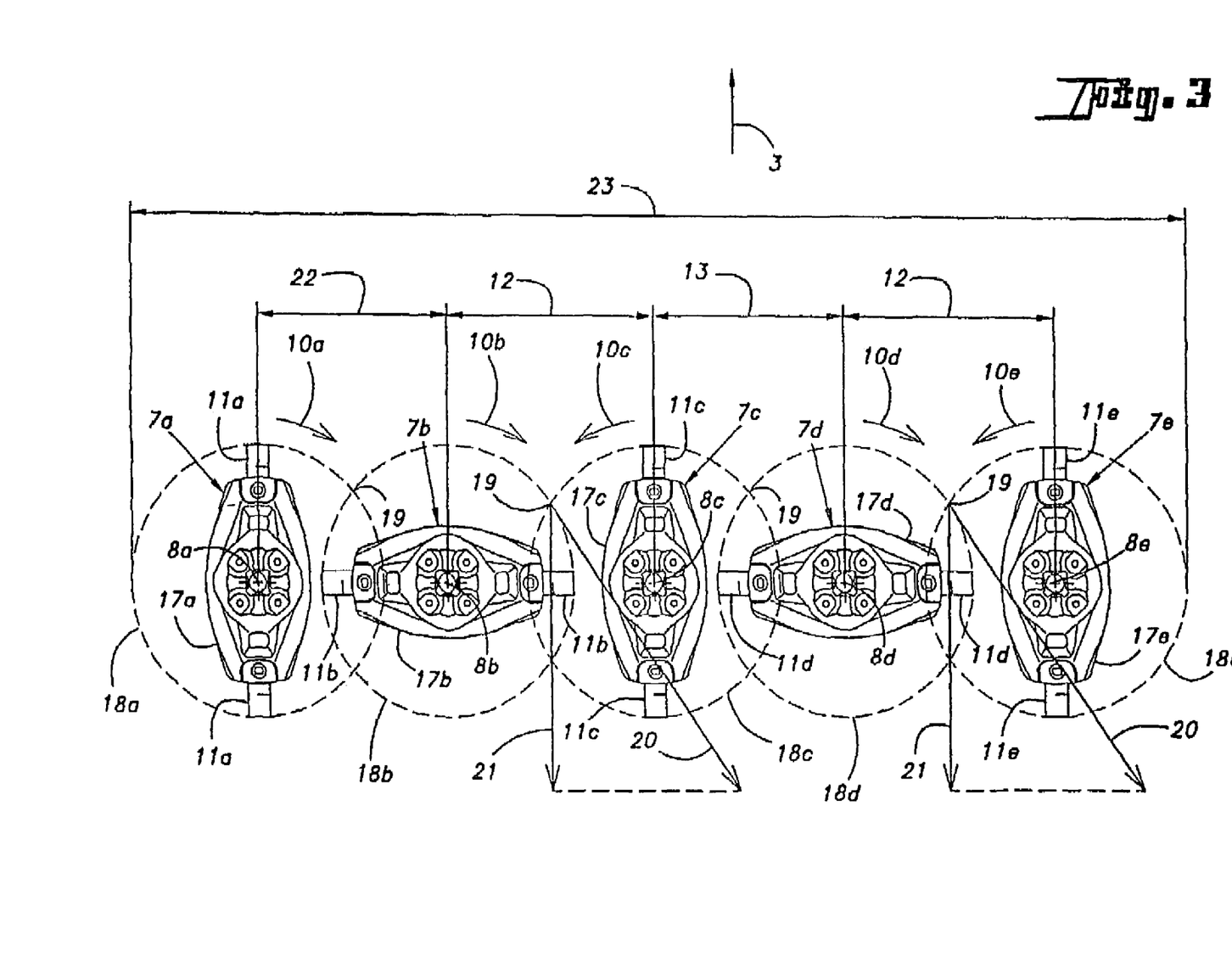
FIG. 3 depicts, viewed from above and to a different scale, the cutting members of the agricultural machine of FIG. 1.

As can be seen more specifically in FIG. 3, each cutting member (7a, 7b, 7c, 7d, 7e) advantageously comprises a support (17a, 17b, 17c, 17d, 17e) and two cutting elements (11a, 11b, 11c, 11d, 11e). Said support (17a, 17b, 17c, 17d, 17e) has an oval shape centered on said axis of rotation (8a, 8b, 8c, 8d, 8e). Said cutting elements (11a, 11b, 11c, 11d, 11e) are connected to the periphery of said support (17a, 17b, 17c, 17d, 17e) on each side of said axis of rotation (8a, 8b, 8c, 8d, 8e). More specifically, said cutting elements (11a, 11b, 11c, 11d, 11e) are advantageously arranged at the ends of a major diameter of said oval shape.

During work, said cutting members (7a, 7b, 7c, 7d, 7e) are rotationally driven. Said cutting elements (11a, 11b, 11c, 11d, 11e) therefore describe circles (18a, 18b, 18c, 18d, 18e) about said axis of rotation (8a, 8b, 8c, 8d, 8e) of the respective cutting member (7a, 7b, 7c, 7d, 7e). For clarity, said circles (18a, 18b, 18c, 18d, 18e) are depicted in dotted lines in FIGS. 1 and 3. The high speed of travel thus reached by said cutting elements (11a, 11b, 11c, 11d, 11e) allows these elements to cut said standing product by impact. As a preference, said circles (18a, 18b, 18c, 18d, 18e) described by the various cutting elements (11a, 11b, 11c, 11d, 11e) have identical diameters. For its part, each support (17a, 17b, 17c, 17d, 17e), in addition to connecting said cutting elements (11a, 11b, 11c, 11d, 11e) to said respective axis of rotation (8a, 8b, 8c, 8d, 8e), also has a function of conveying the cut product.

As can be seen from FIG. 3, said cutting members (7a, 7b, 7c, 7d, 7e) are close enough together that said circles (18a, 18b, 18c, 18d, 18e) described by said respective cutting elements (11a, 11b, 11c, 11d, 11e) overlap. The paths of the cutting elements (11a, 11b, 11c, 11d, 11e) of two adjacent cutting members (7a, 7b, 7c, 7d, 7e) therefore cross at points of intersection (19). As a preference, one of said points of intersection (19) is advantageously situated forward of said casing (9). Thus, the overlap of the cutting areas advantageously guarantees cutting of said standing product across the entire working width (23) of said cutting device (4).

In a particularly advantageous way, said cutting members (7a, 7b, 7c, 7d, 7e) are angularly offset from one another. In the exemplary embodiment depicted in the figures, this angular offset is by about 90 degrees. Said transmission elements arranged inside said casing (9) allow the rotation of said cutting members (7a, 7b, 7c, 7d, 7e) to be synchronized. During work, said angular offset is therefore maintained. Thus, in spite of the overlap of the areas in which said cutting elements (11a, 11b, 11c, 11d, 11e) move, said cutting members (7a, 7b, 7c, 7d, 7e) cannot strike each other.

In the exemplary embodiment depicted in the figures, said cutting device (4) more specifically comprises five cutting members (7a, 7b, 7c, 7d, 7e). For clarity in the remainder of the description and in the figures, the objets that apply to one and the same cutting member will be referenced with the same suffix. Thus, said cutting member (7a) is rotationally driven about an axis (8a) in a direction of rotation (10a).

As can be seen from FIGS. 1 and 3, the cutting member (7a) situated furthest to the left of said casing (9) rotates, when viewed from above, in the clockwise direction (10a). For its part, the cutting member (7e) situated furthest to the right of said casing (9) rotates in the counterclockwise direction (10e). Thus, said cutting members (7a, 7e) situated at the ends of said casing (9) advantageously allow said cut product to be brought closer to a vertical mid-plane of said cutting device (4).

In the exemplary embodiment depicted in the figures, said cutting members (7b, 7d) also rotate in the clockwise direction (10b, 10d). Whereas said cutting member (7c) rotates in the counterclockwise direction (10c). As a result, said cutting device (4) comprises:

adjacent cutting members (7a, 7b) rotating in the same direction of rotation (10a, 10b), adjacent cutting members (7b, 7c; 7d, 7e) that have directions of rotation (10b, 10c; 10d, 10e) that are opposed and converge toward the front, and adjacent cutting members (7c, 7d) that have directions of rotation (10c, 10d) that are opposed and diverge toward the front.

In a way known to those skilled in the art, said adjacent cutting members (7a, 7b) rotating in the same direction of rotation (10a, 10b) allow said cut product to be conveyed transversely to said direction of travel (3). While said adjacent cutting members (7b, 7c; 7d, 7e) that have directions of rotation (10b, 10c; 10d, 10e) that are opposed and converge toward the front allow said cut product to be conveyed toward the rear of said cutting device (4).

Figure 4:
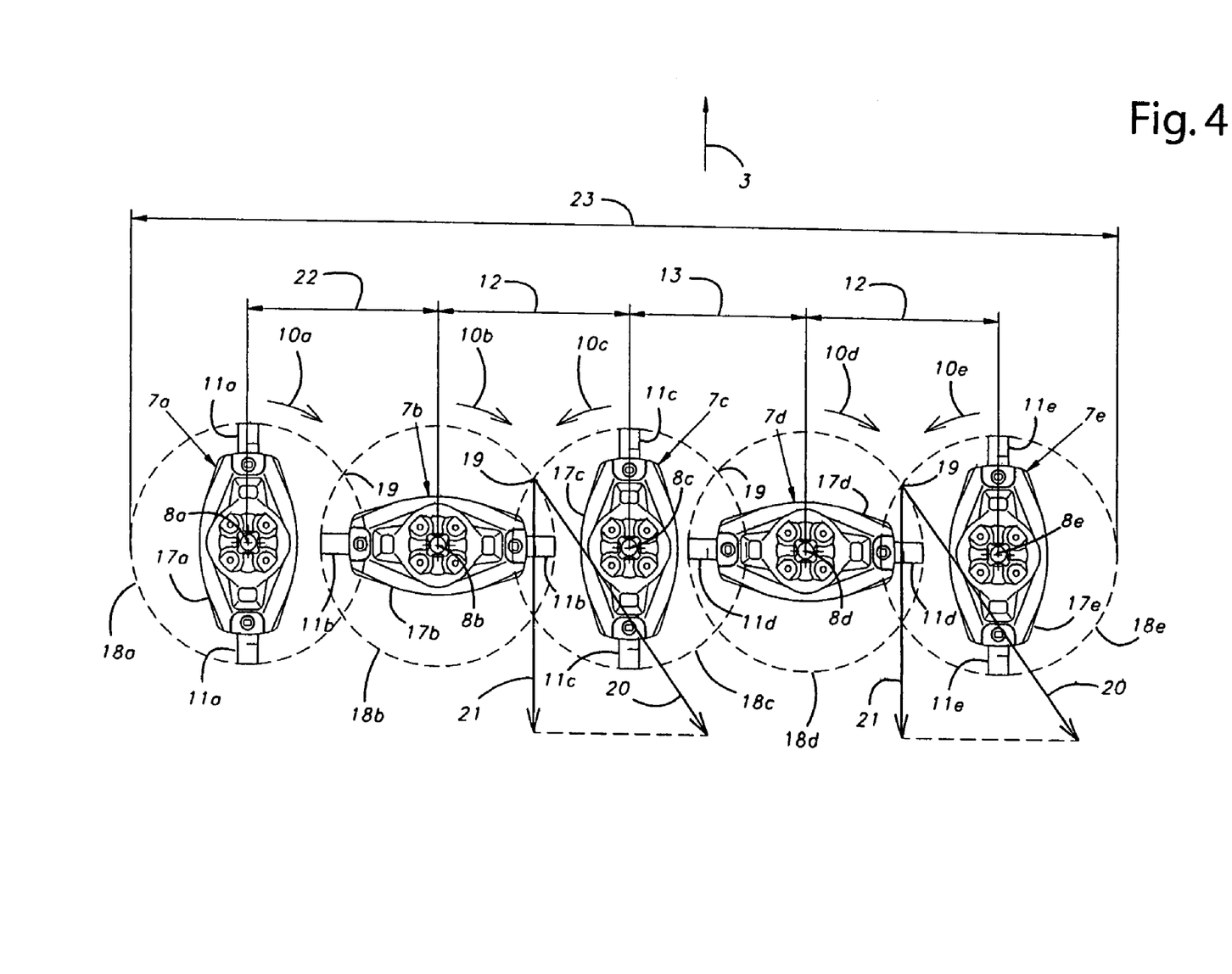
FIGS. 4-7 depict, viewed from above, embodiments of arrangements of the agricultural machine of FIG. 1.

According to an important feature of the present invention, the distance (12) separating the axes of rotation (8b, 8c; 8d, 8e) of two adjacent cutting members (7b, 7c; 7d, 7e) having directions of rotation (10b, 10c; 10d, 10e) that are opposed and converge toward the front, is greater than at least a distance (13, 22) separating the axes of rotation (8a, 8b; 8c, 8d) of two adjacent cutting members (7a, 7b; 7c, 7d) that have directions of rotation (10a, 10b; 10c, 10d) that do not converge toward the front (FIG. 4).

As can be seen more particularly in FIG. 3, the increase in the distance (12) separating the axes of rotation (8b, 8c; 8d, 8e) of two adjacent cutting members (7b, 7c; 7d, 7e) that have directions of rotation (10b, 10c; 10d, 10e) that are opposed and converge toward the front advantageously allows the longitudinal component (21) of the tangent (20) to the point of intersection (19) of said circles (18b, 10c; 18d, 18e) to be increased. The increase in said longitudinal component (21) gives rise to better conveyance of said cut product toward the rear of said cutting device (4).

If, because of space constraints, the working width (23) of said cutting device (4) has to remain the same, the increase in said distance (12) separating the axes of rotation (8b, 8c; 8d, 8e) of two adjacent cutting members (7b, 7c; 7d, 7e) that have directions of rotation (10b, 10c; 10d, 10e) that are opposed and converge toward the front is accompanied by a reduction in at least one of said distance (13, 22) separating the axes of rotation (8a, 8b; 8c, 8d) of two adjacent cutting members (7a, 7b; 7c, 7d) that have directions of rotation (10a, 10b; 10c, 10d) that do not converge toward the front. This reduction in distance (13, 22) between two adjacent cutting members (7a, 7b; 7c, 7d) advantageously allows an increase in the area of overlap of said circles (18a, 18b; 18c, 18d) described by said corresponding cutting elements (11a, 11b; 11c, 11d).

As shown in FIG. 3, the distance separating the axes of rotation of the two adjacent cutting members having directions of rotation that are opposed and diverge toward the front is equal to a distance separating axes of rotation of two adjacent cutting members having identical directions of rotation.

According to another exemplary embodiment according to the present invention and not depicted in the figures, said distance (12) separating the axes of rotation (8b, 8c; 8d, 8e) of two adjacent cutting members (7b, 7c; 7d, 7e) that have directions of rotation (10b, 10c; 10d, 10e) that are opposed and converge toward the front is:
  greater than said distance (13) separating the axes of rotation (8c, 8d) of two adjacent cutting members (7c, 7d) that have directions of rotation (10c, 10d) that are opposed and diverge toward the front, and
  equal to said distance (22) separating the axes of rotation (8a, 8b) of two adjacent cutting members (7a, 7b) that have identical directions of rotation (10a, 10b).

Figure 5:
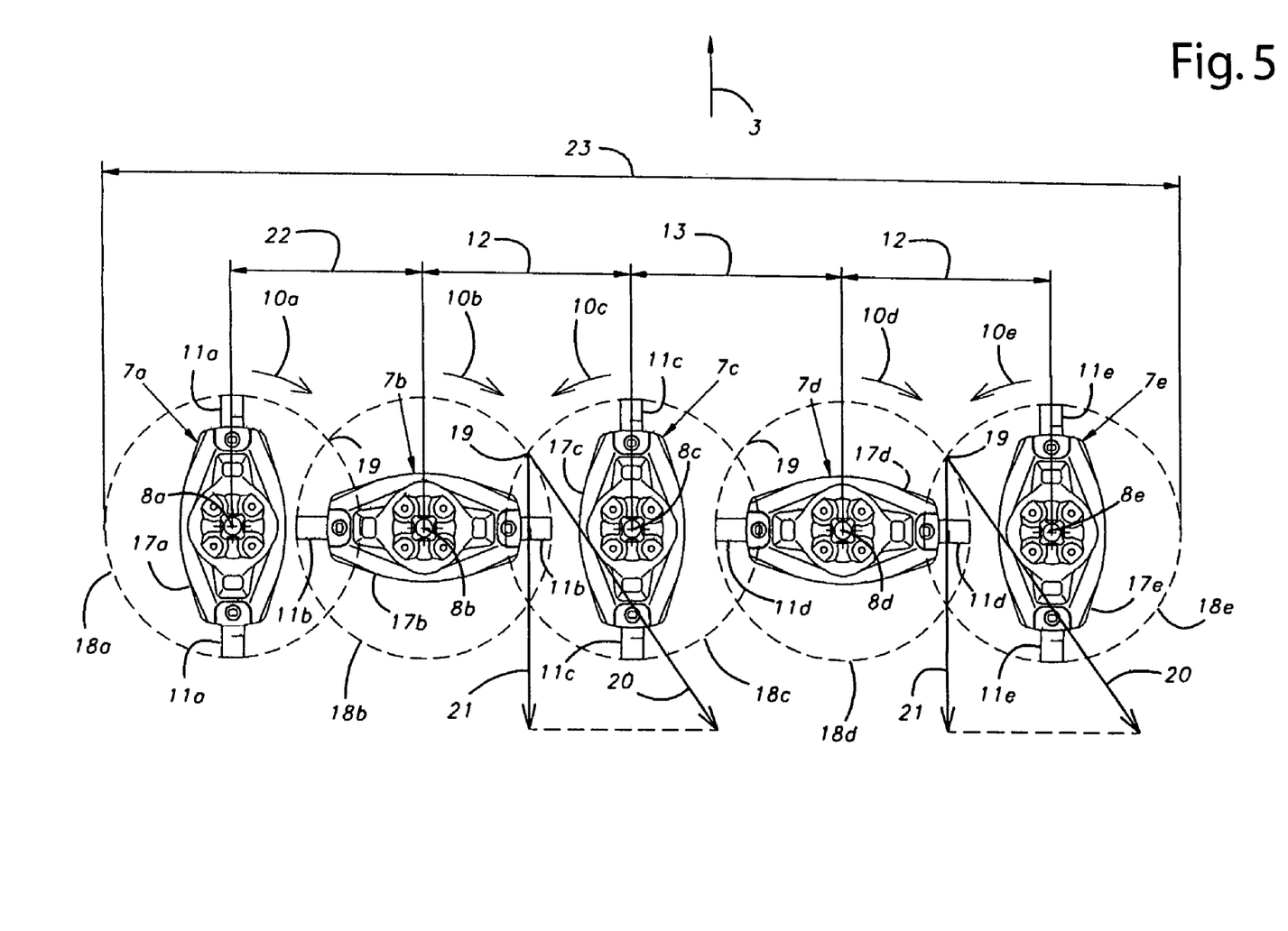

Likewise, according to another exemplary embodiment according to the present invention depicted in FIG. 5, said distance (12) separating the axes of rotation (8b, 8c; 8d, 8e) of two adjacent cutting members (7b, 7c; 7d, 7e) that have directions of rotation (10b, 10c; 10d, 10e) that are opposed and converge toward the front, is:
  greater than said distance (22) separating the axes of rotation (8a, 8b) of two adjacent cutting members (7a, 7b) that have identical directions of rotation (10a, 10b), and
  equal to said distance (13) separating the axes of rotation (8c, 8d) of two adjacent cutting members (7c, 7d) that have directions of rotation (10c, 10d) that are opposed and diverge toward the front.

As a preference, the value of said distance (12) separating the axes of rotation (8b, 8c; 8d, 8e) of two adjacent cutting members (7b, 7c; 7d, 7e) that have directions of rotation (10b, 10c; 10d, 10e) that are opposed and converge toward the front is identical for all said adjacent cutting members (7b, 7c; 7d, 7e) that have directions of rotation (10b, 10c; 10d, 10e) that are opposed and converge toward the front.

Figure 6:
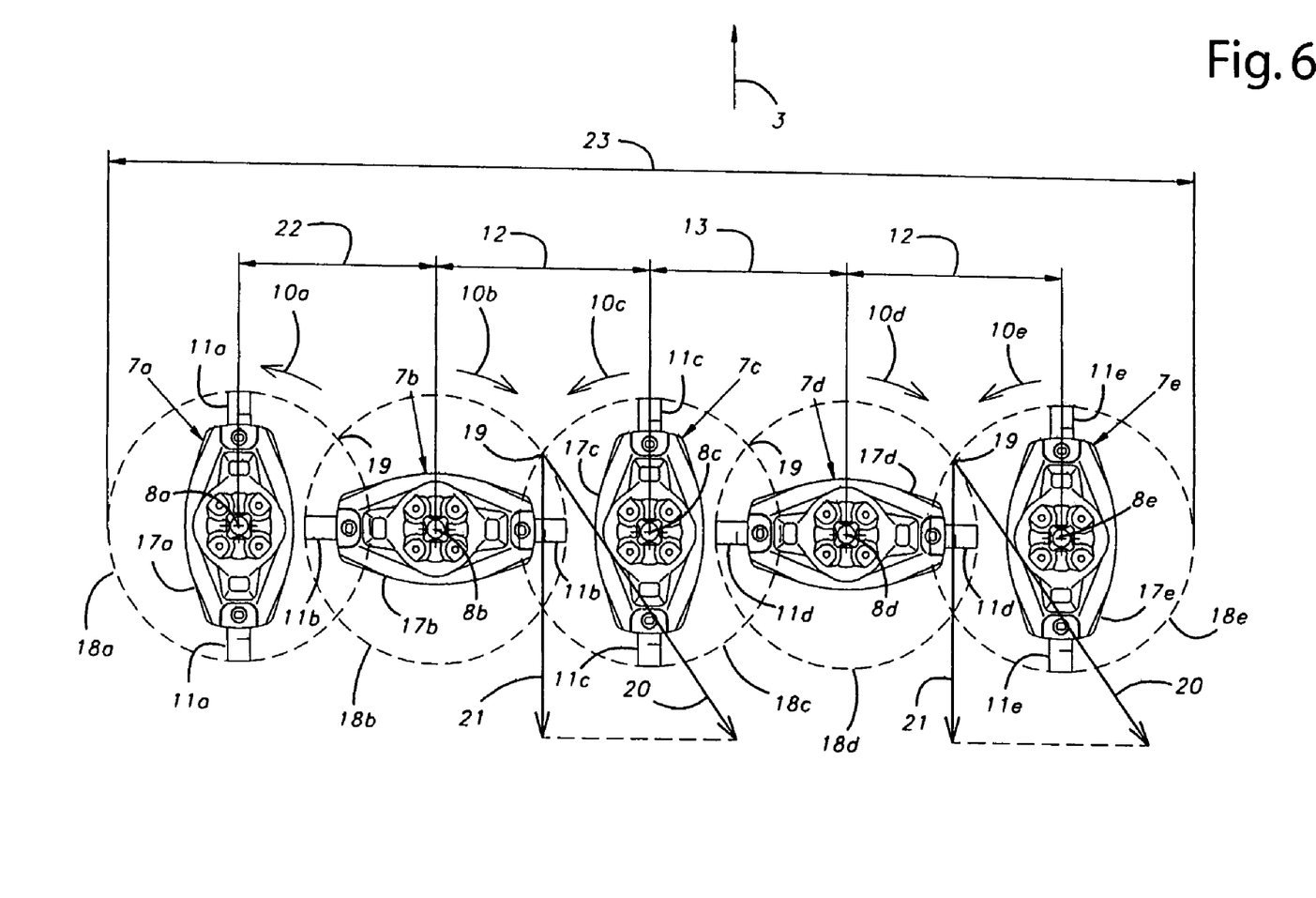

Also as a preference, the value of said distance (13) separating the axes of rotation (8c, 8d) of two adjacent cutting members (7c, 7d) that have directions of rotation (10c, 10d) that are opposed and diverge toward the front is identical for all said adjacent cutting members (7c, 7d) that have directions of rotation (10c, 10d) that are opposed and diverge toward to the front (FIG. 6).

Figure 7:
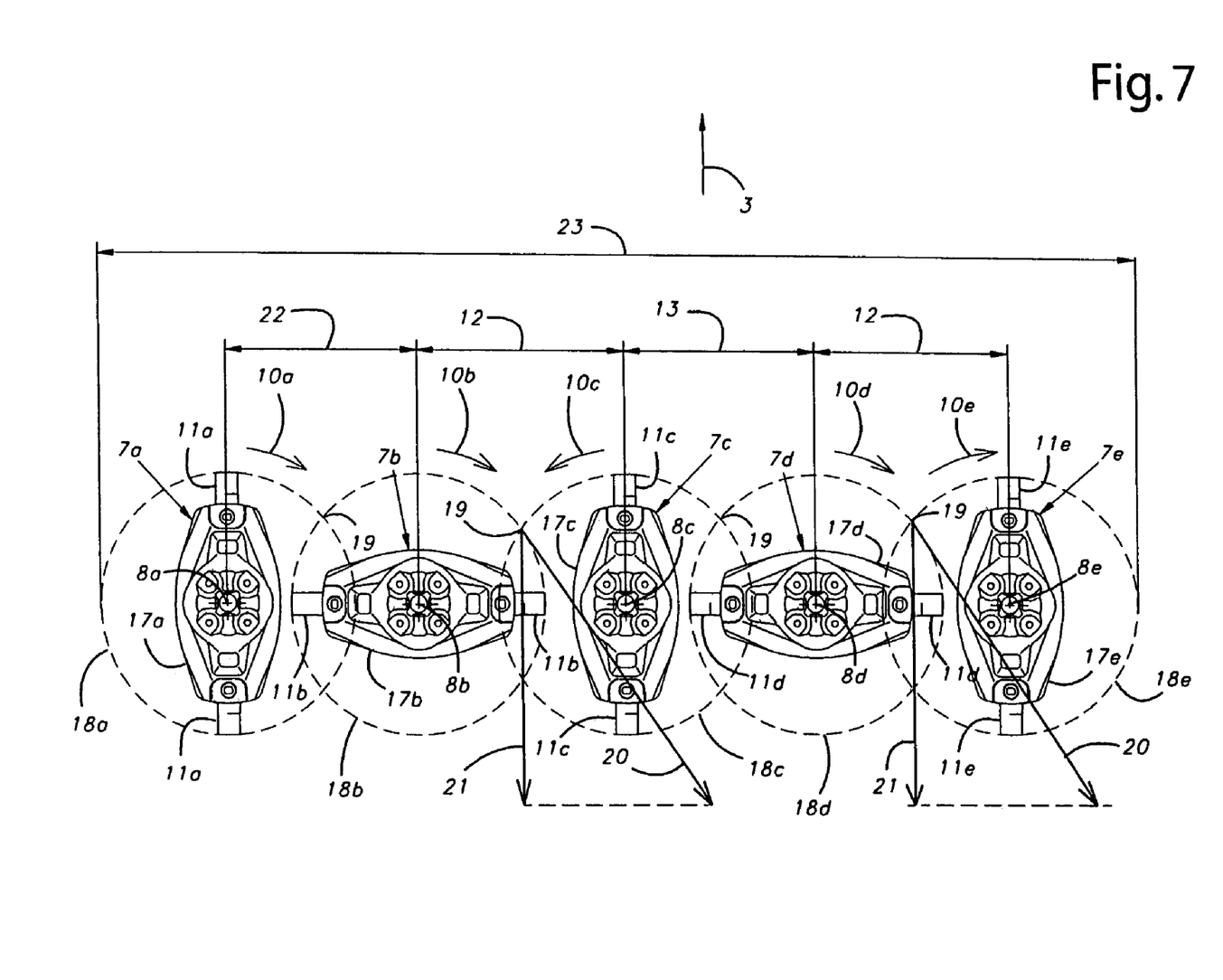

In addition, the value of said distance (22) separating the axes of rotation (8a, 8b) of two adjacent cutting members (7a, 7b) that have identical directions of rotation (10a, 10b) is advantageously the same for all said adjacent cutting members (7a, 7b) that have identical directions of rotation (10a, 10b) (FIG. 7).

As a result, said cutting members (7a, 7b, 7c, 7d, 7e) are arranged above said casing (9) with at most three different spacings. Thus, it becomes simpler to produce said transmission elements and arrange them inside said casing (9).

The mower (1) and the cutting device (4) that have just been described are merely one example that must not be taken to limit the field of protection defined by the claims that follow.

Thus, the cutting device (4) according to the present invention may also equip a mower of the trailed type or a self-propelled mower.

According to another exemplary embodiment that has not been depicted, said casing (9) is a modular casing. What this means is said casing (9) is made up of a collection of modules joined together, each module supporting a cutting member (7a, 7b, 7c, 7d, 7e). In addition, said transmission elements present in said casing (9) can also be produced by means of transmission shafts, pinions involving angle gears, chains or any other known means.

Said support (17a, 17b, 17c, 17d, 17e) of said cutting members (7a, 7b, 7c, 7d, 7e) may have a different shape, for example may be circular or triangular, and supported a different number of cutting elements (11a, 11b, 11c, 11d, 11e).

According to another exemplary embodiment that has not been depicted, said cutting device (4) comprises a different number of cutting member (7a, 7b, 7c, 7d, 7e) higher than two. In addition, the distribution of the directions of rotation (10a, 10b, 10c, 10d, 10e) between the various cutting members (7a, 7b, 7c, 7d, 7e) can also differ provided that there are at least two adjacent cutting members (7b, 7c; 7d, 7e) that have directions of rotation (10b, 10c; 10d, 10e) that are opposed and converge toward the front.

The invention claimed is:

1. An agricultural machine equipped with a cutting device, said cutting device comprising:
  a casing;
  a plurality of cutting members arranged above said casing and connected to said casing and configured to pivot about an upwardly-directed respective axis, the cutting members comprising cutting elements configured to cut along circular paths during rotation, the circular paths of the cutting elements having substantially the same diameters as one another; and
  transmission elements driving rotation of said cutting members about said respective axes;
  wherein of said cutting members, at least two adjacent cutting members have directions of rotation that are opposed and converge toward a front,
  wherein a distance separating axes of rotation of the two adjacent cutting members having directions of rotation that are opposed and converge toward the front is greater than at least a distance separating axes of rotation of two adjacent cutting members that have directions of rotation that do not converge toward the front, and wherein said a distance separating the axes of rotation of the two adjacent cutting members having directions of rotation that are opposed and diverge toward the front is equal to a distance separating axes of rotation of two adjacent cutting members having identical directions of rotation.

2. An agricultural machine equipped with a cutting device, said cutting device comprising:

a casing;

a plurality of cutting members arranged above said casing and connected to said casing and configured to pivot about an upwardly-directed respective axis, the cutting members comprising cutting elements configured to cut along circular paths during rotation, the circular paths of the cutting elements having substantially the same diameters as one another, and transmission elements driving rotation of said cutting members about said respective axes;

wherein of said cutting members, at least two adjacent cutting members have directions of rotation that are opposed and converge toward a front, wherein a distance separating axes of rotation of the two adjacent cutting members having directions of rotation that are opposed and converge toward the front is greater than at least a distance separating axes of rotation of two adjacent cutting members that have directions of rotation that do not converge toward the front, and wherein a value of said distance separating the axes of rotation of the two adjacent cutting members that have directions of rotation that are opposed and converge toward the front is identical for all adjacent cutting members that have directions of rotation that are opposed and converge toward the front.

3. An agricultural machine equipped with a cutting device, said cutting device comprising:

a casing;

a plurality of cutting members arranged above said casing and connected to said casing and configured to pivot about an upwardly-directed respective axis, the cutting members comprising cutting elements configured to cut along circular paths during rotation, the circular paths of the cutting elements having substantially the same diameters as one another; and transmission elements driving rotation of said cutting members about said respective axes;

wherein of said cutting members, at least two adjacent cutting members have directions of rotation that are opposed and converge toward a front, wherein a distance separating axes of rotation of the two adjacent cutting members having directions of rotation that are opposed and converge toward the front is greater than at least a distance separating axes of rotation of two adjacent cutting members that have directions of rotation that do not converge toward the front, and wherein a value of said distance separating the axes of rotation of the two adjacent cutting members that have directions of rotation that are opposed and diverge toward the front is identical for all adjacent cutting members that have directions of rotation that are opposed and diverge toward the front.

4. An agricultural machine equipped with a cutting device, said cutting device comprising:

a casing;

a plurality of cutting members arranged above said casing and connected to said casing and configured to pivot about an upwardly-directed respective axis, the cutting members comprising cutting elements configured to cut along circular paths during rotation, the circular paths of the cutting elements having substantially the same diameters as one another; and transmission elements driving rotation of said cutting members about said respective axes;

wherein of said cutting members, at least two adjacent cutting members have directions of rotation that are opposed and converge toward a front, wherein a distance separating axes of rotation of the two adjacent cutting members having directions of rotation that are opposed and converge toward the front is greater than at least a distance separating axes of rotation of two adjacent cutting members that have directions of rotation that do not converge toward the front, and wherein a value of a distance separating axes of rotation of two adjacent cutting members that have identical directions of rotation is the same for all adjacent cutting members that have identical directions of rotation.

5. An agricultural machine equipped with a cutting device, said cutting device comprising:

a casing;

a plurality of cutting members arranged above said casing and connected to said casing and configured to pivot about an upwardly-directed respective axis, the cutting members comprising cutting elements configured to cut along circular paths during rotation, the circular paths of the cutting elements having substantially the same diameters as one another, and transmission elements driving rotation of said cutting members about said respective axes;

wherein of said cutting members, at least two adjacent cutting members have directions of rotation that are opposed and converge toward a front, wherein a distance separating axes of rotation of the two adjacent cutting members having directions of rotation that are opposed and converge toward the front is greater than at least a distance separating axes of rotation of two adjacent cutting members that have directions of rotation that do not converge toward the front, and wherein said cutting members are aligned in one straight line.

6. An agricultural machine equipped with a cutting device, said cutting device comprising:

a casing;

a plurality of cutting members arranged above said casing and connected to said casing and configured to pivot about an upwardly-directed respective axis, the cutting members comprising cutting elements configured to cut along circular paths during rotation, the circular paths of the cutting elements having substantially the same diameters as one another, and transmission elements driving rotation of said cutting members about said respective axes;

wherein of said cutting members, at least two adjacent cutting members have directions of rotation that are opposed and converge toward a front, wherein a distance separating axes of rotation of the two adjacent cutting members having directions of rotation that are opposed and converge toward the front is greater than at least a distance separating axes of rotation of two adjacent cutting members that have directions of rotation that do not converge toward the front, and wherein a path of said cutting elements of two adjacent cutting members cross at points of intersection.

* * * * *